(12) United States Patent
Matsumoto

(10) Patent No.: US 6,800,399 B2
(45) Date of Patent: Oct. 5, 2004

(54) NON-SINTERED THIN ELECTRODE FOR BATTERY, BATTERY USING SAME AND PROCESS FOR SAME

(76) Inventor: Isao Matsumoto, 3-8-10, Ueshio, Tennoji-ku, Osaka-shi, Osaka-fu (JP), 543-0002

( * ) Notice: Subject to any disclaimer, the term of this patent is extended or adjusted under 35 U.S.C. 154(b) by 181 days.

(21) Appl. No.: 09/870,257

(22) Filed: May 30, 2001

(65) Prior Publication Data

US 2002/0025475 A1 Feb. 28, 2002

(30) Foreign Application Priority Data

Aug. 30, 2000 (JP) ........................................ 2000-261780
Oct. 18, 2000 (JP) ........................................ 2000-318407

(51) Int. Cl.$^7$ .......................... H01M 4/66; H01M 4/72; H01M 4/78
(52) U.S. Cl. ....................... 429/241; 429/239; 429/243; 429/245; 429/218.2
(58) Field of Search ............................. 429/241, 218.2, 429/223, 233, 239, 243, 245

(56) References Cited

U.S. PATENT DOCUMENTS

| | | | |
|---|---|---|---|
| 4,251,603 A | 2/1981 | Matsumoto et al. | |
| 5,543,250 A | 8/1996 | Yanagihara et al. | |
| 5,824,435 A | 10/1998 | Kawano et al. | |
| 5,840,441 A | 11/1998 | Hirofumi et al. | |
| 5,840,444 A | 11/1998 | Takeshima et al. | |
| 6,444,366 B1 * | 9/2002 | Kawano et al. ............. | 429/241 |

FOREIGN PATENT DOCUMENTS

| | | | |
|---|---|---|---|
| JP | 2000-48823 | 2/2000 | |
| WO | WO 99/63608 | * 12/1999 | ............ H01M/4/70 |

OTHER PUBLICATIONS

Ikoma et al., "Self–Discharge Mechanism of Sealed–Type Nickel/Metal–Hydride Battery," *Journal of the Electrochemical Society*, vol. 143, No. 6 (Jun. 1996).

Matsumoto et al., "Ni–Fe Battery," extended abstract from ECS Detroit Meeting (1982), no month.

Ikoma et al., "Study on Self–Discharge of a Metal Hydride Rechargeable Battery System Employing MmNi$_{5-x}$M Alloy," extended abstract from 174th Chicago (Fall) Meeting (1988), no month.

Yuasa et al., "Study on a Charge Characteristics of a Nickel/Hydride Battery System," extended abstract from 178th Seattle (Fall) Meeting (1990), no month.

Fujiwara et al., "Development of a Hydrogen Absorbing Alloy for the Negative Electrode of Sealed Nickel–Hydride Battery System," extended abstract from 180th Phoenix (Fall) Meeting (1991), no month.

Matsumoto et al., "A Sealed Ni/MH Battery System for EV," extended abstract from 183rd Honolulu (Spring) Meeting (1993), no month.

Matsumoto et al., "Foamed Nickel Positive Electrode for a High Performance Cylindrical Ni–Cd Battery," *Power Sources 12*, pp. 203–220 (1988), no month.

Ogawa et al., Metal Hydride Electrode for High Density Sealed Nickel–Metal Hydride Battery, *Power Sources 12*, pp. 393–410 (1988), no month.

Matsumoto et al., Ni–Fe Battery, *ECS Fall Meeting*, Detroit, Abstract 10 (1981), no month.

* cited by examiner

*Primary Examiner*—Tracy Dove
(74) *Attorney, Agent, or Firm*—Merchant & Gould, P.C.

(57) ABSTRACT

An electrode substrate is formed by mechanically processing a nickel foil so as to be made three dimensional through the creation of concave and convex parts, and then, this substrate is filled with active material or the like so that an electrode is manufactured, wherein the above described concave and convex parts are rolling pressed so as to incline in one direction. Furthermore, an electrode for secondary battery is formed by using the above described method.

9 Claims, 13 Drawing Sheets

(a)

(b)

NON-SINTERED THIN ELECTRODE FOR BATTERY, BATTERY USING SAME AND PROCESS FOR SAME

FIELD OF INVENTION

The present invention relates to a paste type thin electrode for a battery, in which the cost is reduced and the high rate discharge characteristics and the cycle life are improved, and to a secondary battery using this electrode.

BACKGROUND OF THE INVENTION

At present electrodes for batteries, used commercially for secondary batteries, are broadly categorized as sintered type electrodes and non-sintered type electrodes. In the sintered type electrodes, active material is filled into a highly porous three dimensional substrate where metal powder is sintered to have a large porosity on both sides of a two dimensional metal substrate. In the non-sintered type electrodes, the active material powder with a binder is coated on a two dimensional metal substrate or grid, or filled into a three dimensional substrate, such as foamed nickel, metal bag or tube, without employing a sintered substrate.

In general, the former exhibits excellent characteristics in electronic conductivity (high-rate charge and discharge characteristics) due to a large amount of metal used in the sintered plaque and has a long cycle-life with excellent mechanical strength and stability in the shedding of active material, while it has the defect that the electrode is heavy and has a small volumetric energy density due to a small amount of active material impregnated therein because of a large volume of the electrode substrate.

On the contrary, a representative and simple non-sintered type electrode is inexpensive and light weight, and has a large volumetric energy density because of using an inexpensive substrate of a small volumetric amount in the electrode, which is easy to manufacture, through the coating or direct filling process of active material powder, while it entails the problem that the entire electrode is inferior in current collection ability as a whole, in the mechanical strength and in the holding of the active material. These are significant problems in secondary batteries where charging and discharging is repeated and, therefore, a variety of ideas are incorporated into respective battery systems.

As a result, non-sintered types have a variety of substrates to improve the above problems, as represented by a paste type or an application type, wherein active material powder is mixed with conductive material or a binder which is then mixed together with a solution and the obtained paste or slurry is coated on a two dimensional substrate of a variety of shapes, or in some cases the active material powders are filled in a pocket type or a tube type substrate which has innumerable small pores for electrochemical reactions.

As examples of non-sintered type electrodes, which are of the former type, a cadmium negative electrode, a metal hydride negative electrode for alkaline storage batteries, the positive and negative electrodes for lithium ion batteries and the positive and negative electrodes for lead acid batteries are cited. Non-sintered type batteries which are of the latter type are, for example, employed in part of the nickel positive electrode for large scale alkaline storage batteries or for certain types of lead acid batteries. As a substrate of the electrodes described herein, punching metal, a metal screen, foamed metal, a metal grid or the like are individually utilized according to the battery systems or the purpose.

However, recently, new types of electrodes in which a paste of active materials is filled into a foamed nickel porous substrate or into a nickel fiber substrate, which have a three dimensional structure, in the high density (hereinafter abbreviated as 3DM type), have started being employed as proposed in U.S. Pat. No. 4,251,603, which belongs to another non-sintered type in classification. However, though these types of electrodes have a high capacity and a high reliability and are easily made to have higher capacity and to be lighter weight compared with the sintered type, due to a small amount of metal employed in the substrate, they have the technical problems that the mechanical strength is low and the electronic conduction of the entire electrode is inferior due to a large pore diameter within the substrate and, in addition, have the technical problem that the cost of the substrate is high.

Since the present invention of paste type electrode relates to an improvement of the three dimensional substrate used in the above described 3DM system, in particular for alkaline storage battery system currently, for the convenience of the detail technological description of prior art, a nickel positive electrode for a small sealed cylindrical Ni/MH batteries is focused on thereafter.

As for the nickel positive electrode for alkaline storage batteries, the sintered type electrode, which was developed in Germany during the Second World War, has a high performance and is durable, which replaced the previous non-sintered type electrode, that is to say, the pocket type electrode, and, therefore, a sintered type electrode started to be used for rectangular Ni/Cd batteries requiring high performance and high reliability. As for the negative electrode, a similar conversion to the sintered type has occurred. As for the electrodes of sealed cylindrical Ni/Cd batteries developed afterwards, sintered type positive and negative electrodes have become the most popular because they are easily processed into thin electrodes. The small sealed cylindrical batteries represented by this nickel-cadmium battery (Ni/Cd battery) have achieved a dramatic growth as a power supply for portable compact electronic equipments, such as camcorders or CD players, which have achieved a remarkable growth in Japan starting in the 1980's. However, in the 1990's, a new type of nickel-metal hydride storage battery (Ni/MH battery) and a lithium ion battery successively have been put into practical use so as to begin expansion into the market of nickel-cadmium batteries.

And, as for a new market, applications for power supplies as power tools, applications for mobile power supplies, that is to say, for electrical vehicles (EVs), hybrid electrical vehicles (HEVs), electric power assisted bicycles or the like have newly started growing in recent years, and for those power supplies mainly Ni/MH batteries have started being used. A nickel positive electrode is employed for the positive electrodes of the above described Ni/Cd batteries and Ni/MH batteries for which the growth recently has been remarkable and the sintered types and 3DM types are used respectively, according to the applications under the present circumstances.

As for the structure of this nickel positive electrode for a mass-production level, the non-sintered type was limited only to the pocket type, due to the electrode mechanical stability. The pocket type electrode has a structure wherein active material powder is filled into a electrolyte proof metal bag with innumerable small pores to prevent the shedding of active metal powders as described above. The sintered type adopts a structure wherein a solution of active material salt is impregnated into the space of a three dimensional sintered plaque, followed by the process of conversion to the active material with alkaline solution. Naturally, the active material in this case is not in a powder condition.

Another non-sintered 3DM type, which is different from the pocket type, is reported as a nickel positive electrode employing foamed nickel in the ECS Fall Meeting (Detroit) Abstract No. 10 in 1981. This electrode has a structure using a foamed nickel porous body as a substrate, into which active material powder is filled.

Though a light weight nickel positive electrode with a high capacity is realized by using this foamed nickel as a substrate, it has the problems that the high power drain of the entire active material is not sufficient due to the large diameter of the internal spherical space, which is approximately 450 $\mu$m in the case of even the smallest diameter, and it is expensive. Therefore, batteries using a sintered type nickel positive electrode which exhibit excellent characteristics in high-rate discharge are still the most popular for applications requiring high power drain.

However, the following shortcomings of the sintered type electrodes for those applications have been increasing, as problems in practical use, while applications are expanding, and, therefore, the introduction of the paste type electrodes are desirable. The shortcomings are: small energy density; heavy weight; large self-discharge due to the well-known shuttle reaction between nitride and nitrate ions, which is not present in the non sintered type. Since those applications require a high-rate discharge, thin electrodes are, in general, employed to increase the electrode surface area in order to have a large active area, which also increases the area of the substrates of the electrodes. Accordingly, a two dimensional substrate or a three dimensional substrate of low cost are particularly required and also light weight is a prerequisite for these high-power uses.

Therefore, new structures of three dimensional substrates to replace expensive foamed nickel such as in the 3DM type, which is a kind of the paste type of light weight, are proposed as follows:
(1) One sheet of electrode is formed by overlapping a plurality of extremely thin electrodes wherein active material powder is coated on the porous substrate, such as thin punched metal and foamed metal.
(2) Innumerable pieces of metal in the form of bristle or whisker are attached to a porous substrate, such as metal foil and punched metal (U.S. Pat. No. 5,840,444).
(3) Burrs are provided on a metal plate in the direction of the thickness of the plate (U.S. Pat. No. 5,543,250).
(4) A metal plate is processed to have a three dimensional corrugated form. Holes with burrs are provided on the crests of the corrugated form so as to increase the three dimensional shape (U.S. Pat. No. 5,824,435).

The structures or the substrates in the above described (1) to (4), however, have not solved all of the problems. In (1), there still remains the problem of the active mass shedding of each thin electrode due to the swelling of the active material during charge and discharge cycles, which essentially cannot be prevented. In (2), the thickness of the paste layer lacks uniformity due to the low binding strength between the metal fiber in bristle or whisker, or due to the non-uniformity of the holes of the substrate itself with respect to its characteristics and, additionally, it costs more than the conventional substrates. In (3), the structure is basically not three dimensional and, therefore, it has problems in the shedding of the active material powders following a decay in charge and discharge characteristics. In (4), though the above described problems have been improved to some extent and low cost can be expected, there still remains the problem that a desired three dimensional substrate shape is difficult to maintain. Because, the substrate of the corrugated form is easily expanded in the direction of the wave form during the electrode press work, which leads to the problem that the active material is easily peeled off from the substrate when it is wound into an electrode of a spiral form or when charging and discharging are repeated.

In addition, power supplies for electric power tools are desired, derived from how power tools are used, to have high-rate discharge characteristics, and the batteries for power-use, such as electric vehicles (EVs), hybrid electric vehicles (HEVs) and electric power assisted bicycles are desired to have improved high-rate discharge characteristics, particularly desired to be smaller and to be lighter in order to secure space within the vehicles and in order to improve fuel efficiency respectively, that is to say, to increase volume energy density (Wh/l) and gravimetric energy density (Wh/kg).

SUMMARY OF THE INVENTION

The present inventor solved the above described problems by forming an electrode for alkaline storage batteries as an application example as follows:
(a) Forming a conductive electrode substrate from a metal foil which is provided with innumerable concave and convex hollow parts or forming the same shape metal substrate by the metal deposition through an electrolytic method;
(b) Adjusting the thickness of the above described electrode substrate to substantially the same thickness as that of the electrode;
(c) For limiting the above described substrate to become two dimensional, partially or as a whole, by the electrode press work after filling the paste of active material powders as the main material, arranging the position of said concave and convex parts of the conductive electrode substrate to maintain the current collection ability of the whole electrode; and
(d) Preventing the peeling of the active material powders layer from the substrate through the spirally winding process of the electrode and also the shedding of active material powders that formed the electrode through the repetitive charging and discharging afterwards, by bending the walls of the concave and convex hollow parts into one direction specifically in the vicinity of the edge, just as to wrap the space between the concave and the next concave or the convex and the next convex in order to prevent the shedding of the active material powders.

In addition, by maintaining all the active material powder, within 150 $\mu$m in the distance from the nearest conductive electrode substrate, the charging and discharging reaction, particularly the high rate discharge reaction, of the active material powder is enhanced and by using a cylindrical battery case wherein a ratio ($t_2/t_1$) of the thickness ($t_2$) of the bottom to the thickness ($t_1$) of the side walls is 1.5 or more, that is to say, by using a case of which the side walls have become thinner, the secondary battery is further made lighter and made larger in capacity.

Though the present invention is not particularly limited to a nickel positive electrode, in the case of application for a nickel positive electrode, in particular, a thinner nickel positive electrode is provided in which the thickness is 500 $\mu$m or less for alkaline storage batteries, and the electrode uses an inexpensive, light weight and conductive metal substrate that can be formed only through mechanical operations on a metal foil or only through electrolytic metal deposition on the same pattern, without sintering or plating, resulting in excellent characteristics in charge and discharge characteristics, restraining the shedding of active material powder and light weight. Therefore, an inexpensive, light weight sealed cylindrical or prismatic nickel-metal hydride battery (Ni/MH battery) that shows excellent characteristics of high-rate charge/discharge and long cycle-life is achieved.

DESCRIPTION OF PREFERRED EMBODIMENTS

Figure 1:
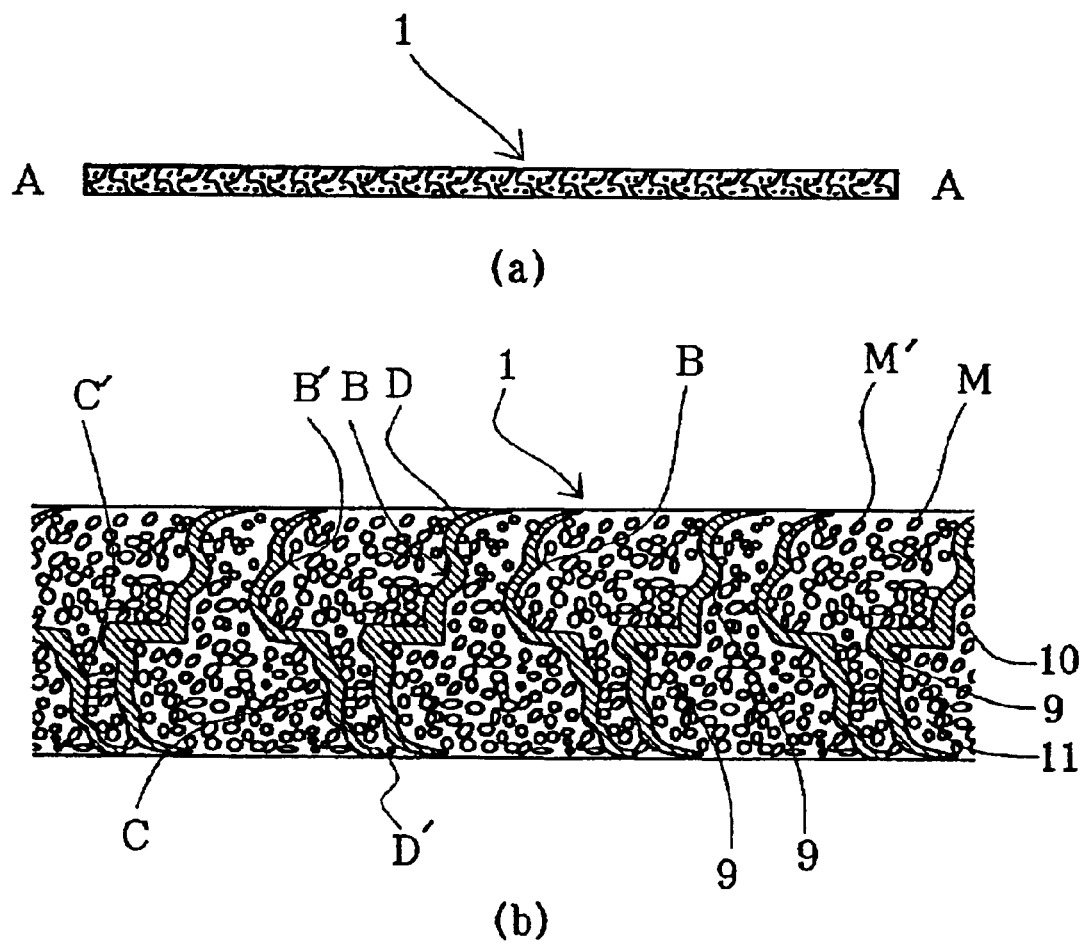
FIGS. 1(a) and 1(b) are schematic cross section views of a nickel positive electrode according to one mode of the present invention.

In the following, in reference to the drawings, a sealed cylindrical nickel-metal hydride battery is described as an example wherein an electrode obtained by winding a nickel positive plate 1, whose main material is nickel hydroxide powder and whose electrode thickness is 500 μm or less, and an alloy negative plate 2, whose main material is hydrogen absorption alloy powders and of which electrode thickness is much thinner than that of the positive electrode, together with a separator 3 made of non-woven sheet of polyolefin-type synthetic resin fiber, is inserted into a cylindrical metal case and then an alkaline electrolyte solution is poured in the case, which is then sealed.

Here, an electrode obtained by filling the paste 10, that has been obtained by mixing the main material and the like, into a conductive electrode substrate 9 which is made three dimensional through a press work applied to a nickel foil of a thickness of 20 to 50 μm between the upper and the lower plate dies, wherein an innumerable number of concavities and convexities are mutually provided so as to engage each other and, then, by pressing after drying, is used as the positive electrode. From the viewpoint of cost-effectiveness and ease for producing the same type of a substrate, particularly in the case where the thickness close to 20 μm, the method of electrolytic nickel deposition is available as well. In this case, the nickel deposition of about 20 μm is carried out on the cathode, the surface of which has innumerable hollow concavities and convexities of a desired pattern, in the conventional electrolysis bath of pH 2.0 containing mainly nickel sulfate. And, this method can also can provide a long strip of substrate with innumerable hollow concavities and convexities by employing a rotary drum as the cathode. After the said substrate is annealed at approximately 850° C. to have much more mechanical strength, it can be used for the electrode substrate.

Long cycle-life electrodes with excellent charge/discharge characteristics can be obtained through the three dimensional structure of the substrate, which is made as a three dimensional model to almost the same thickness as the electrode, particularly, through a structure wherein the shapes of the hollow concavities and convexities bend, in one direction, to a greater extent in relation to proximity to the edges so as to wrap the space of the substrate. The resultant structure is excellent in current collection and wraps the active mass tightly in a manner not inferior to that in the sintered type or 3DM type.

Long cycle-life electrodes with excellent charge/discharge characteristics can be obtained because the above described conductive electrode substrate has a structure which is excellent in current collection performance and the wrapping of the active material powder is not inferior to that of sintered type or 3DM type, since it is made to be a three dimensional structure of approximately the same thickness as the final electrode, particularly, to be a structure wherein the closer to the edges of the hollow unevenness the stronger they become and the more bent they are in one direction so as to enclose the space areas in the substrate. In addition, since this substrate can be manufactured only by passing between dies which engage with each other through the unevenness, it becomes inexpensive because of the simple process and when it is wound to an electrode of a spiral wound form, the electrode is not broken apart. As a result, Ni/MH batteries are obtained that are easy to process and which are inexpensive with high performance and high reliability.

Since the alloy negative electrode is improved in the electric current collection performance due to the thickness which is approximately ½ of the positive electrode, it can withstand a high-rate discharge of approximately 20 C. discharge at room temperature. However, in the case that a much higher rate discharge is necessary, it is preferable to adopt a three dimensional nickel electrode substrate according to the present invention for the alloy negative electrode.

Here, though, Ni/MH batteries are described for the convenience of the description above, the present invention can be applied in the same way to electrodes for Ni/Cd batteries or Li secondary batteries which need a high-rate discharge.

Figure 2:
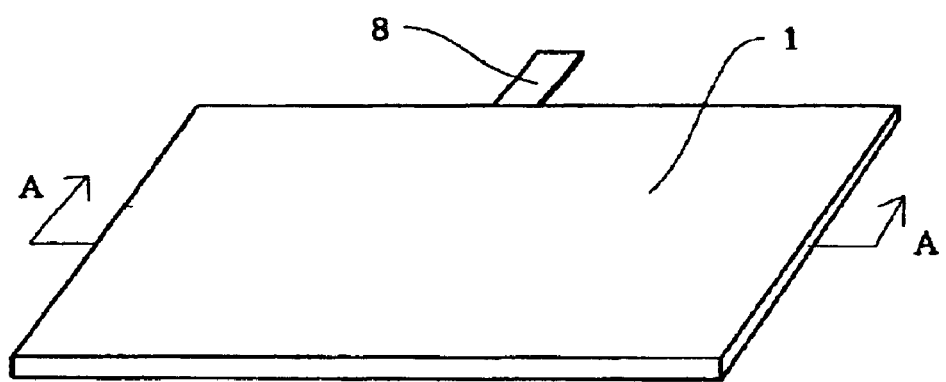
FIG. 2 shows a nickel positive electrode according to one embodiment of the present invention. The cross section view along A—A is shown in FIG. 1.

FIG. 1 shows a cross section view taken along line A—A in FIG. 2 of the nickel positive electrode 1 according to the present invention. In FIG. 1, a nickel metal part forming a three dimensional nickel substrate is denoted as 9, and mixed powder mainly containing nickel hydroxide powder filled into this substrate is denoted as 10 and a hollow area is denoted as 11. The walls of the convex part B or B' and of the concave part C or C' in the three dimensional substrate processed from a nickel foil have a contour while tilting to one side and the edge D or D' of nickel part is less thick and further more tilting to the side. This contour and the tilt of the edges limit the shedding of the fillings such as the active material powder from the substrate. The tilt of the edges do not cause microscopic short circuit with the opposite electrode by becoming an electrode whisker and, therefore, this also has the effect of making the shortest distance from the nickel substrate to the active material powder grain (in the vicinity of M in the figure) which is farthest away to be shorter than in the case of not bending (in the vicinity of M'), that is to say, the effect of enhancing the current collection ability of the entire electrode is provided. In the case of a nickel positive electrode, when the commercially available active material powder is used and the distance from the conductive electrode substrate becomes more than 150 μm, the deterioration of voltage at high-rate discharge occurs and the rate of utilization of the active material is lowered. Therefore, it is preferable to use a metallic plate wherein the conductive electrode substrate of a thin electrolyte-proof metal foil has a three dimensional structure by forming innumerable concave and convex parts and the shortest distance between a majority of said powders and the said conductive electrode substrate is maintained within 150 μm. In addition, unlike the electrode substrate which has electric conductivity, the active material has very little electric conductivity since it is mainly composed of $Ni(OH)_2$. Therefore, it is preferable to add about 5 wt % of a powder with electric conductivity and cobalt oxide in the active material powder paste in order to enhance current collection characteristics. Further, in the case where further improvement of high-rate discharge characteristics is desired with the requirement of higher power as a battery, it is preferable to use the active materials in the active material layer on a substrate having a three dimensional structure by forming concave and convex parts with the shortest distance between a majority of said powders and the said conductive electrode substrate being maintained within 150 μm. This is because when the amount of a powder with electric conductivity and cobalt oxide added in the active material powder in order to enhance current collection characteristics is increased, the amount of the active materials contained is decreased. When the specific explanation is made using the Figure, it is preferable to decide the size of the concavities and convexities as well as the pitch so that the distance between the M' in FIG. 1 and the closest conductive electrode substrate is maintained within 150 μm.

FIG. 2 shows an overall view of a nickel positive electrode 1 which has a structure as shown in FIG. 1, which is a thin nickel positive electrode whose the thickness is 500 μm or less.

Figure 3:
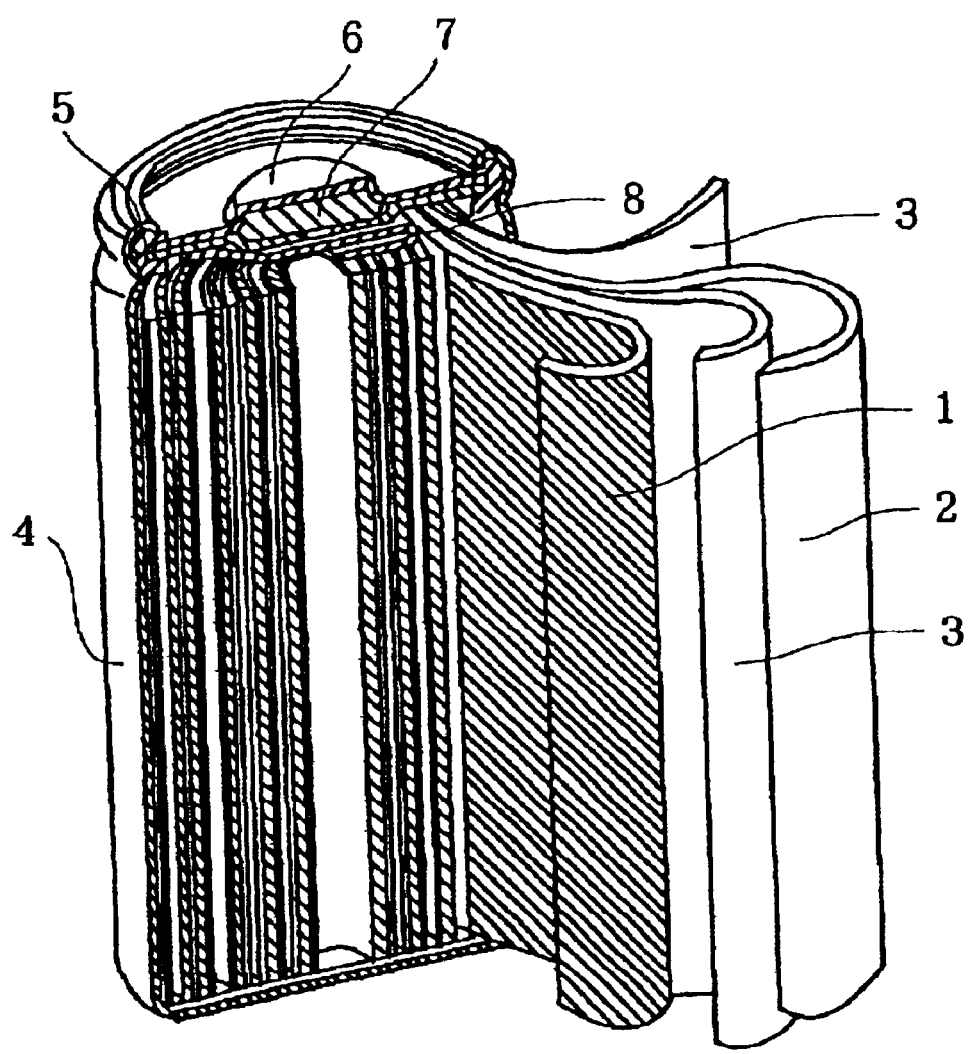
FIG. 3 shows a sealed cylindrical Ni/MH battery (AA size) construction according to one mode of the present invention.

FIG. 3 is a schematic diagram of a sealed cylindrical Ni/MH battery construction of AA size which is obtained by the combination of a thin nickel positive electrode in FIG. 2 and a thin alloy negative electrode wherein MmNi5 type hydrogen absorbing alloy powder is coated on punched metal in the same way as in a prior art. With respect to each of the components other than electrodes of the battery, basically they are the same as those in a conventional battery structure.

The conductive electrode substrate according to the present invention may be any material as long as it has a conductivity and the process for providing the unevenness and for contour and tilts of the walls is possible after the filling of the active material powder and is not limited particularly. However, the material of the conductive electrode substrate is properly used at least on the surface of the conductive electrode substrate by selecting one kind or more from a group consisting of nickel, copper, aluminum, lead and alloys whose main components are those metals, which are employed in a variety of electrodes for batteries at present. Particularly, it is preferable for materials used as a nickel electrode for an alkaline storage battery to be selected at least one from a group consisting of cobalt, calcium, titanium, silver, yttrium, lanthanide, carbon and/or their oxides, which are arranged on the major part of the surface, from the view point of easiness of processing. The thickness of the conductive electrode substrate which is made three dimensional with the hollow concave and convex parts of the conductive electrode substrate according to the present invention is the thickness which is approximately the same as the final electrode which is pressed after the powder mainly containing the active material powder or pseudo-active material powder is filled in or coated on the electrode and, more concretely, it is preferable for the above described thickness of the conductive electrode substrate to be 0.5 to 2.0 times as large as the thickness of the final electrode.

In the case that the thickness of the above described conductive electrode substrate is 0.5 or less times as large as the thickness of the final electrode, the high rate discharge characteristics are slightly lowered, and the contact area between the active material powders or pseudo-active material powders and conductive electrode substrate is decreased, which is not preferable because the active material powder becomes to be shedded. In the case that the thickness of the above described conductive electrode substrate is 2.0 or more times as large as the thickness of the final electrode, it becomes difficult to form a metal foil with concave and convex parts and to form the same by an electrolytic deposition method as well, and therefore it is not preferable. Particularly, in the case that the present invention is used for a nickel positive electrode, it is preferable that the thickness of the conductive electrode substrate is 1.0 to 2.0 times as large as the thickness of the final electrode. Here, the final electrode refers to an electrode obtained by press work after the paste that mainly contains active material powders is filled in or is coated on.

The innumerable concave and convex parts which are hollow in the conductive electrode substrate according to the present invention represent concave and convex parts in a shape of having the inner wall surfaces while the concave and the convex forms are not filled in with the material forming the conductive electrode substrate.

The pseudo-active material in the present invention is the material that absorbs and desorbs active material such as Li (lithium), H (hydrogen), or the like. The active material may be occluded in the pseudo-active material or may be occluded in a form of a compound with other materials as long as it is released as a active material.

The method of filling in or coating of the paste of which the main material is the active material powders or the pseudo-active material powders according to the present invention is not particularly limited, and a well known method for filling in or coating can be applied.

The shapes of the concave parts and convex parts in the conductive electrode substrate according to the present invention are not particularly limited and, therefore, they may be a hollow cone form, or a hollow polygonal pyramid form such as a triangular pyramid form, quadrangular pyramid form or a hexagonal pyramid form. Though the respective edges of the concave parts and convex parts may have open holes or may be closed, it is preferable to have open holes since the strength against mechanical (physical) peeling of the active material layer and uniformity of the electrode reaction on active material layers on both sides of the substrate are easily obtained.

The above described conductive electrode substrate in the present invention is a substrate having innumerable microscopic concavities and convexities on the major part of the surface, which is preferable for increasing the cycle life and the high-rate charge/discharge characteristics since is further increases the electric conductivity between the substrate and the active material or pseudo-active material.

As for the arrangement pattern of most concave and convex parts in the above described substrate according to the present invention, it is preferable for columns of many concave parts or concave part groups, as well as columns of many convex parts or convex part groups to be mutually provided approximately in parallel to each other to form an angle in the range of 30 degrees to 60 degrees with the direction of electrode length. By providing the above described columns of many concave parts or concave part groups, as well as columns of many convex parts or convex part groups, alternately approximately parallel to each other, the distance between respective convex parts (concave parts) is easily maintained at a constant value and stability is provided, which lead to good wrapping ability of the active material powders in the substrate and good conductivity over the entire electrode.

The conductive electrode substrate in the present invention has the following concave and convex parts or groups thereof. That is, the number of the concave parts is not less than half the number of concave and convex parts, wherein the said concave and convex parts are adjacent and closest to the convex part, the number of groups of concave parts is not less than half the number of groups of concave and convex parts, wherein the said groups of concave and convex parts are adjacent and closest to the groups of convex parts, the number of convex parts is not less than half the number of concave and convex parts, wherein the said concave and convex parts are adjacent and closest to the concave part, and the number of groups of convex parts is not less than half the number of groups of concave and convex parts, wherein the said concave and convex parts are adjacent and closest to the groups of concave parts.

Together with this, as described in the above, by providing columns of many concave parts or concave part groups and many convex parts or convex part groups at an angle within the range of 30 degrees to 60 degrees with the direction of electrode length, an excessive expansion and an uneven expansion of the substrate can be restrained at the time of press work of the electrode to maintain a uniform three dimensional substrate within the electrode.

Figure 7:
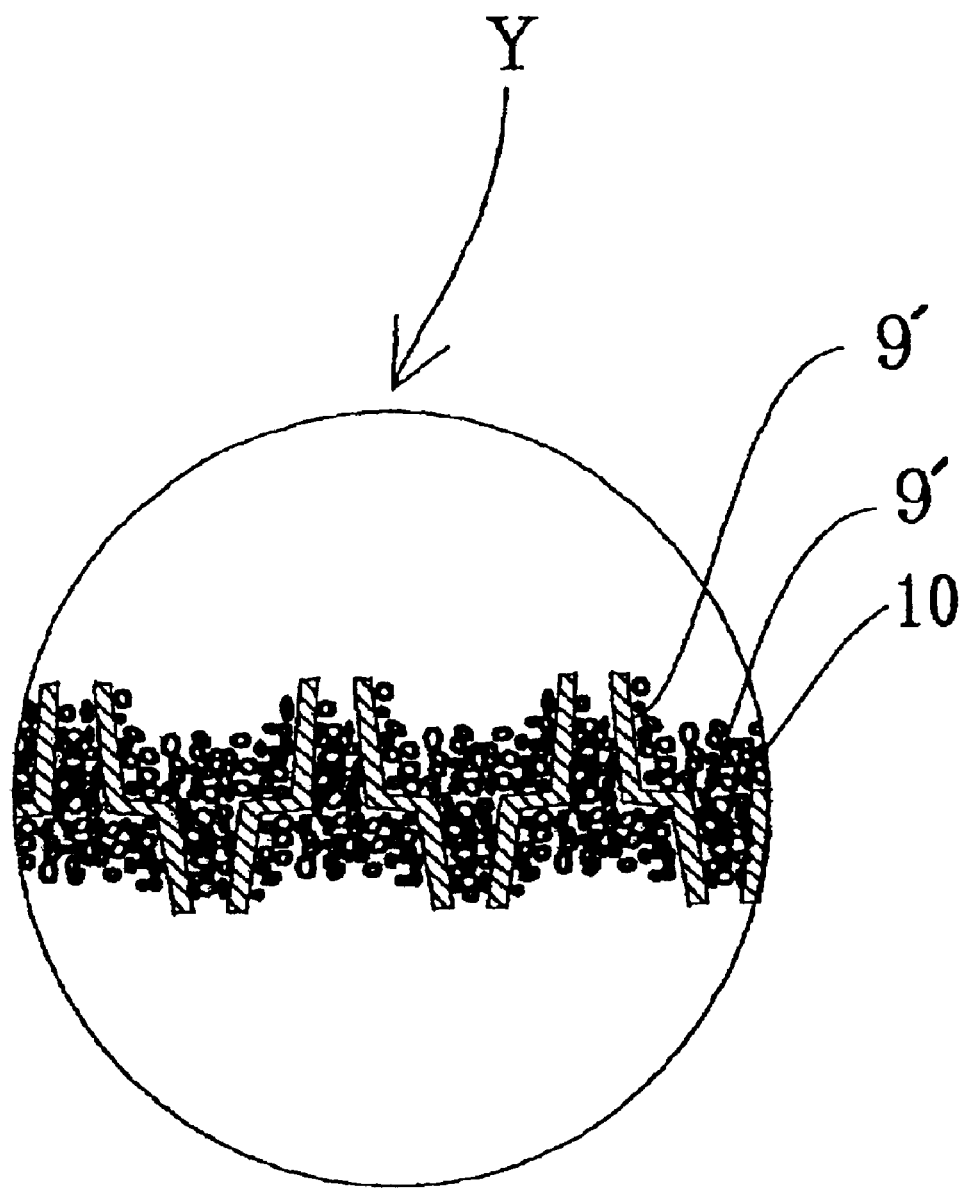
FIG. 7 is a cross section view of the electrode after filling the paste of active material powder into the substrate.

The contour and the tilts of the walls of the convex and the concave parts in the conductive electrode substrate according to the present invention can be formed through press work with a rolling press machine comprising pre-press work through a pair of rollers with small diameters and real press work for forming the final electrode through a pair of rollers with large diameters. Since this press work processing is applied to the conductive electrode substrate wherein the active material or the pseudo-active material is filled in or coated on, the walls of the concave and convex parts are made to have contours in the direction of the thickness of the conductive electrode substrate so as to be more tilted in one direction at areas closer to the edges of the concave and convex parts. If the thickness of the substrate before filling in the active material powder is large enough, when the active material powder is filled in the substrate having a thick thickness as shown in the partially enlarged view of FIG. 7, both surfaces of the substrate may be bent slightly in advance so as to be bent in one direction. In addition, in the above described roll press work, pre-pressuring may be carried out by passing the processed material through a slit with a doctor knife or a rubber spatula or by brushing with a rotary brush. And, in the case that the conductive electrode substrate is made three dimensional to a greater degree as described above, inclination of the concave and convex parts in one direction, particularly a greater inclination of the edge parts as shown in Part D of FIG. 1 can be effectuated, by means of press work with a rolling machine only using a large diameter press roll, and omitting a pre-press process.

It is preferable that the final electrode is coated with fine powders of fluororesin. This is in order to prevent the edges of the concave and convex parts of the conductive electrode substrate from sticking out of the electrode like whiskers or from sticking out of the separator, which can cause short circuits, in addition to preventing the active material powder from shedding. Accordingly, as for the kinds of synthetic resins used for the coating of the electrode, in addition to the fluororesin, resins having electrolyte-proof and binding characteristics such as resins containing polyolefine, polyvinyl-type and polysulfone powders or their copolymers as the main material can be applied.

In the case that the paste-type thin electrode for batteries according to the present invention is processed into a spiral electrode, the edges of the concave and convex parts of the conductive electrode substrate are, preferably, tilted in the direction perpendicular to the winding direction so as to prevent them from forming whiskers through the electrode swelling due to the repetition of charging and discharging.

In addition, a secondary battery according to the present invention is a battery wherein the above described electrodes are inserted into a battery case and the positive electrode lead is connected to a lid by means of spot welding, or the like, and then the lid is caulked to the aperture part of the battery case.

A secondary battery according to the present invention can be obtained by inserting the above described electrodes according to the present invention into a container of a battery case of the desired external diameter size such as D, C, AA, AAA and AAAA.

As for a battery case in a secondary battery according to the present invention, in the case that the secondary battery of the present invention is used in the application where the capacity is enlarged and weight reduced in, for example, a battery for an HEV, it is preferable to use a light weight battery case wherein the ratio ($t_2/t_1$) of the thickness ($t_2$) of the bottom to the thickness ($t_1$) of the side wall is 1.5 or more and, moreover, it is more preferable for the ratio ($t_2/t_1$) of the thickness ($t_2$) of the bottom to the thickness ($t_1$) of the side wall to be approximately 2.0, from the view point of extra strength against internal cell pressure of the side walls of the container and a secure crack prevention which might occur from the spot welding to the bottom. In the case that a secondary battery according to the present invention shows superior characteristic in connecting cells in series by spot welding which is important for HEVs, or the like, the battery has a thick bottom case in the conventional, preventing from making a blow-hole in a battery during the welding process. In further explanation, making the ratio ($t_2/t_1$) of the thickness ($t_2$) of the bottom to the thickness ($t_1$) of the side wall 1.5 or more, the thickness that can withstand the spot welding is secured for the thickness of the bottom compared to an ordinary battery case where the thickness of the side walls and the thickness of the bottom of a battery case are approximately the same. In addition, by making the side walls thinner it becomes possible to reduce the weight of the battery case by approximately 30% without changing the material so that the inside volume simultaneously increases, which allows the capacity of the secondary battery to be larger. Here, the above described welding is carried out according to a well known welding method and is carried out within the range of 1000° C. to 3000° C. of the welding temperature at the spot welding part.

In a secondary battery according to the present invention, in the case of a battery case of AAAA size wherein the ratio ($t_2/t_1$) of the thickness ($t_2$) of the bottom to the thickness ($t_1$) of the side wall is 1.5 or more, when a battery case in which the thickness of the bottom is approximately 0.2 mm and the thickness of the side walls is 0.11 mm ($t_2/t_1$=1.82), a capacity increase of approximately 5% is achieved compared to the case where a battery case of the same material is used in which the thickness of the bottom is approximately 0.2 mm and of which the thickness of the side walls is 0.2 mmm ($t_2/t_1$=1).

Though the material of the battery case in a secondary battery of the present invention is not particularly limited, it is preferable to use iron with an applied nickel plating for an alkaline storage battery from the viewpoint of electrolyte-proof properties and it is preferable to use aluminum, or aluminum alloy, in addition to iron for a lithium secondary battery from the viewpoint of weight reduction.

Figure 10:
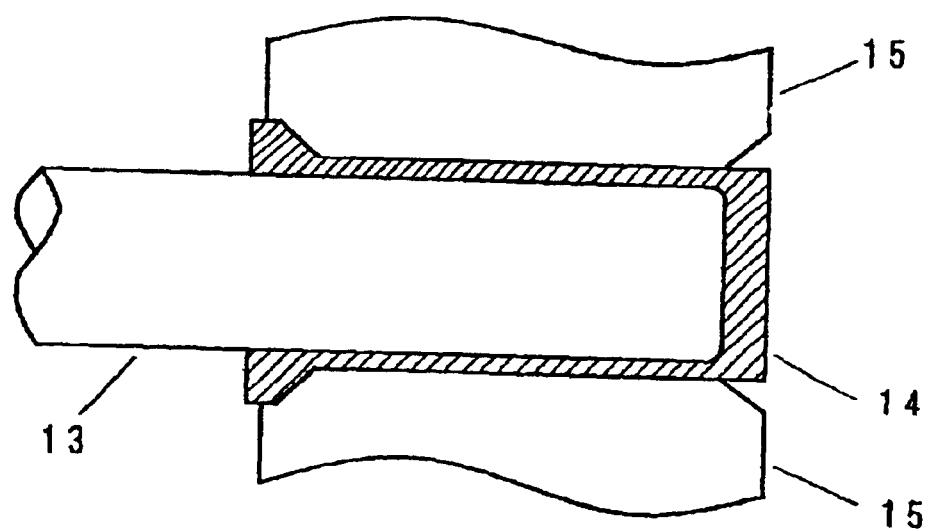
FIG. 10 shows a stroking and squeezing step.

Though the above described battery case can be manufactured by a well known method, including several times of ironing processes, it is preferable to manufacture by drawing and ironing processing at the same time in order to attain a thinner side wall and a ratio ($t_2/t_1$) of the thickness ($t_2$) of the bottom to the thickness ($t_1$) of the side wall of 1.5 or more. In case that the battery case is manufactured by ironing process using many processing steps to move closer to the desired battery case structure, generally the thickness of the bottom and of the side walls become approximately equal. However, since ironing with drawing process is a method for forming a cylindrical container 14 with a bottom from a metal plate through extrusion by one revolution of the spindle 13 as shown in FIG. 10, a battery case having a desired thickness of the side walls easily can be formed to gain the above described battery case by adjusting the gap between the spindle and the mold 15.

Figure 11:
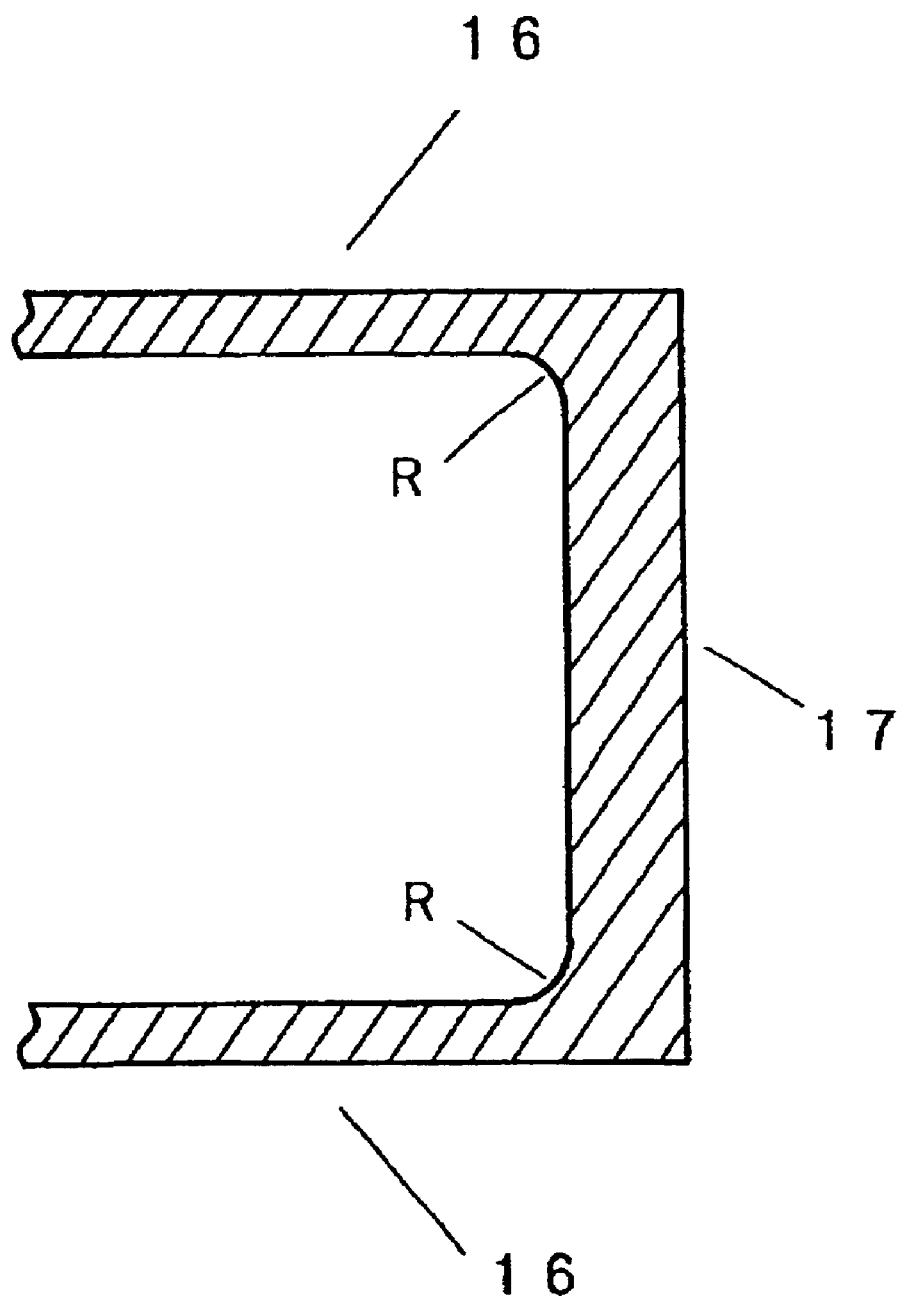
FIG. 11 is an enlarged cross section view of a battery case manufactured through the stroking and squeezing step.

In the battery case of a secondary battery according to the present invention, it is preferable that thicker parts are provided along the border between the side walls 16 and the bottom 17 within the battery case in order to secure the mechanical strength. The above described thicker parts are the parts indicated by R in FIG. 11 and by processing the external periphery of the edge part of the spindle used at the time of battery case formation so as to be rounded, the thicker parts of the corresponding battery case can be provided easily. Effects can be recognized even when a spindle to which a slight rounding processing is applied is used and rounding of 1 mm of diameter is appropriate for a battery case of AA size without lowering the battery capacity.

Though a secondary battery according to the present invention can be made lighter in battery weight by employing the above described electrodes, a further lighter secondary battery can be provided by using a battery case in which the side walls are further thinner and in which the ratio ($t_2/t_1$) of the thickness ($t_2$) of the bottom to the thickness ($t_1$) of the side wall is 1.5 or more.

Embodiments

Next, a concrete embodiment of the present invention is described.

Production Example

As shown in FIG. 10, a nickel plated steel plate (plating thickness of 1 $\mu$m) having a thickness of 0.3 mm, which is punched out into a circle, is submitted to one cycle of ironing with drawing by spindle 13 in the manner known in the art so as to form a cylindrical container 14 with a bottom. More concretely, as for the dimensions the outer diameter is 14 mm, the thickness of the side walls is 0.16 mm and the thickness of the bottom is 0.25 mm. Here, it is preferable to provide thicker parts R at the border part of the inside of the case between the side walls and the bottom, in order to prevent the physical strength of the border from being weakened.

Embodiment 1

Figure 4:
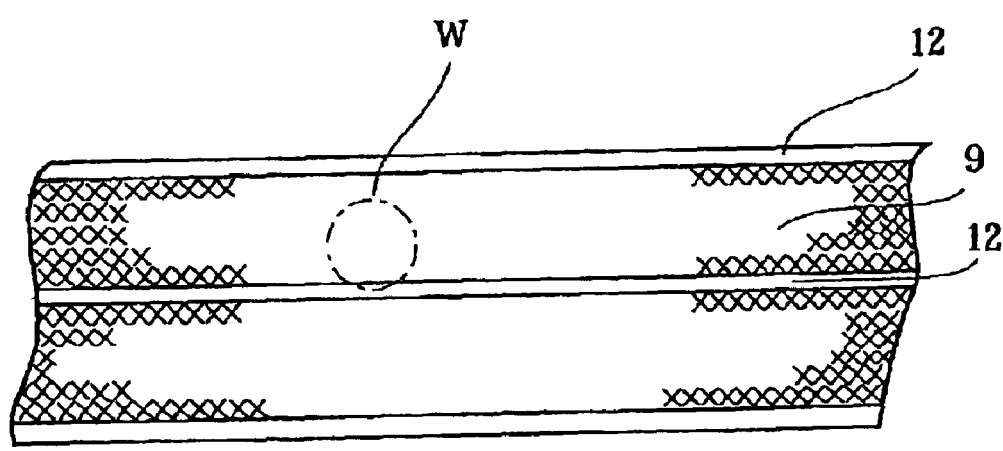
FIG. 4 shows an electrode substrate in a wide belt-like form utilized for the nickel positive electrode according to one mode of the present invention.
Figure 5:
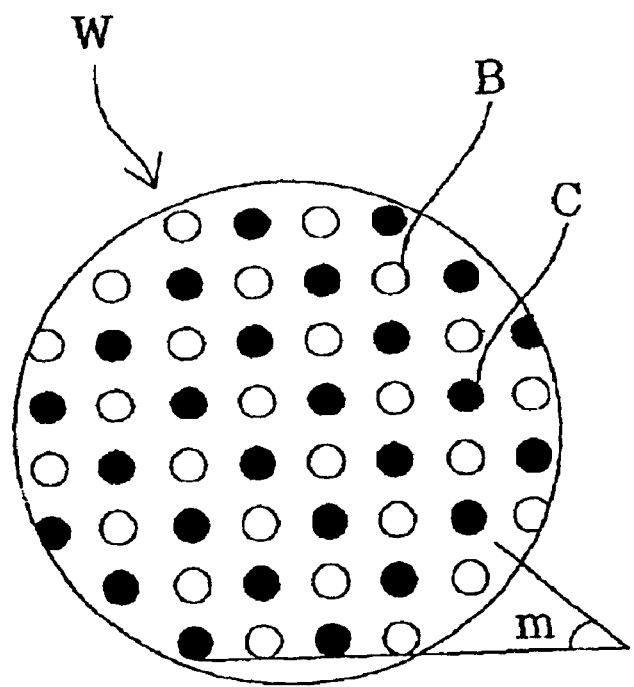
FIGS. 5(a) and 5(b) show two examples of patterns for unevenness processing.
Figure 5:
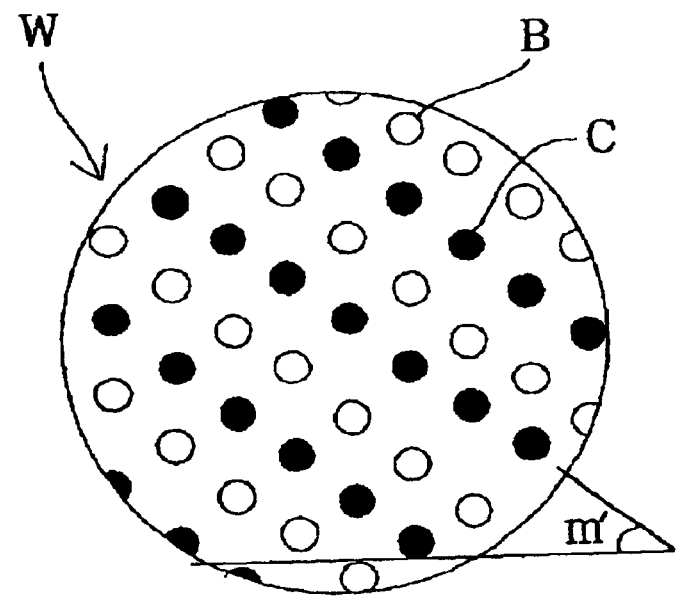

Nickel foil in a wide belt-like form, having a thickness of 30 $\mu$m, is pressed between a pair of dies (or between rollers) wherein innumerable microscopic conical concavities and convexities are formed on the surface of the both dies so that a three dimensional conductive electrode substrate having innumerable microscopic hollow chimney shapes in the nickel electrode substrate 9 of FIG. 4 is manufactured. Two examples of the possible kinds of patterns of the concave and convex parts of the nickel substrate 9 in FIG. 4 are shown in FIGS. 5(a) and 5(b) which are the partially enlarged figures of the nickel electrode substrate, wherein parts B and C in FIG. 5 indicate the convex parts and the concave parts, respectively. The closest parts to the convex parts (concave parts) in FIG. 5(a) are all concave parts (convex parts) and in FIG. 5(b) the closest parts to the convex parts (concave parts) are concave parts (convex parts) in a ration of four out of six. In the present embodiment the pattern of FIG. 5(a) is adopted. The closest parts to the convex parts (concave parts) in FIG. 5(a) are all concave parts (convex parts) wherein the diameter of the hollow substantially conical structure is about 60 to 80 $\mu$m at the base and 35 to 45 $\mu$m in the edges. They are completely formed by a press work between a pair of the upper and lower dies to which unevenness of the same pattern as in FIG. 5(a) is provided so that if the thickness of the foil is thin, the majority of the edges of concavities and convexities have openings. The thickness of the substrate, which is formed three dimensional with concave and convex parts, is 500 $\mu$m, which is thicker than the thickness of the final electrode by approximately 100 $\mu$m. The pitch between the convex parts column and the closest convex parts (or the pitch between concave parts and the closest concave parts column) is 150 to 250 $\mu$m in the wide belt-like form. The angle (m) formed by the columns of the convex parts (concave parts) with the longitudinal direction of the electrode substrate is approximately 45 degrees. A part to where this type of uneven processing is not applied is denoted as 12, a part of which is utilized as an electrode lead. A slight corrugated form processing may be applied to the part 12 in the longitudinal direction of the electrode substrate for the purpose of alleviating the distortion with the parts where the active material exists due to the electrode swelling at the time of press work.

The paste of the active material powders with fluororesin powders is filled into the nickel electrode substrate 9 to which innumerable microscopic hollow chimney form concave and convex parts are provided in accordance with the pattern of FIG. 5(a). As for the active material powders, the main component is nickel hydroxide and, here, active material powder of spherical form whose grain diameter is approximately 10 $\mu$m, formed of approximately 1 wt. % of cobalt and approximately 3 wt. % of zinc dissolved into nickel hydroxide so as to form a solid solution, is employed. This active material powders (approximately 75 wt %) is kneaded with a water solution (approximately 25 wt %)

wherein approximately 1 wt. % carboxymethyl cellulose, approximately 1 wt. % of polyvinyl alcohol are dissolved. Then, cobalt oxide (CoO) and zinc oxide (ZnO) in a ratio of approximately 3 wt. % and approximately 2 wt. % of the said active material powders are added respectively to gain the final paste. This paste of mixed powder including the active material is filled into the nickel electrode substrate 9 and, then, is partially dried, of which the condition is shown in the partially enlarged figure of FIG. 5.

Figure 6:
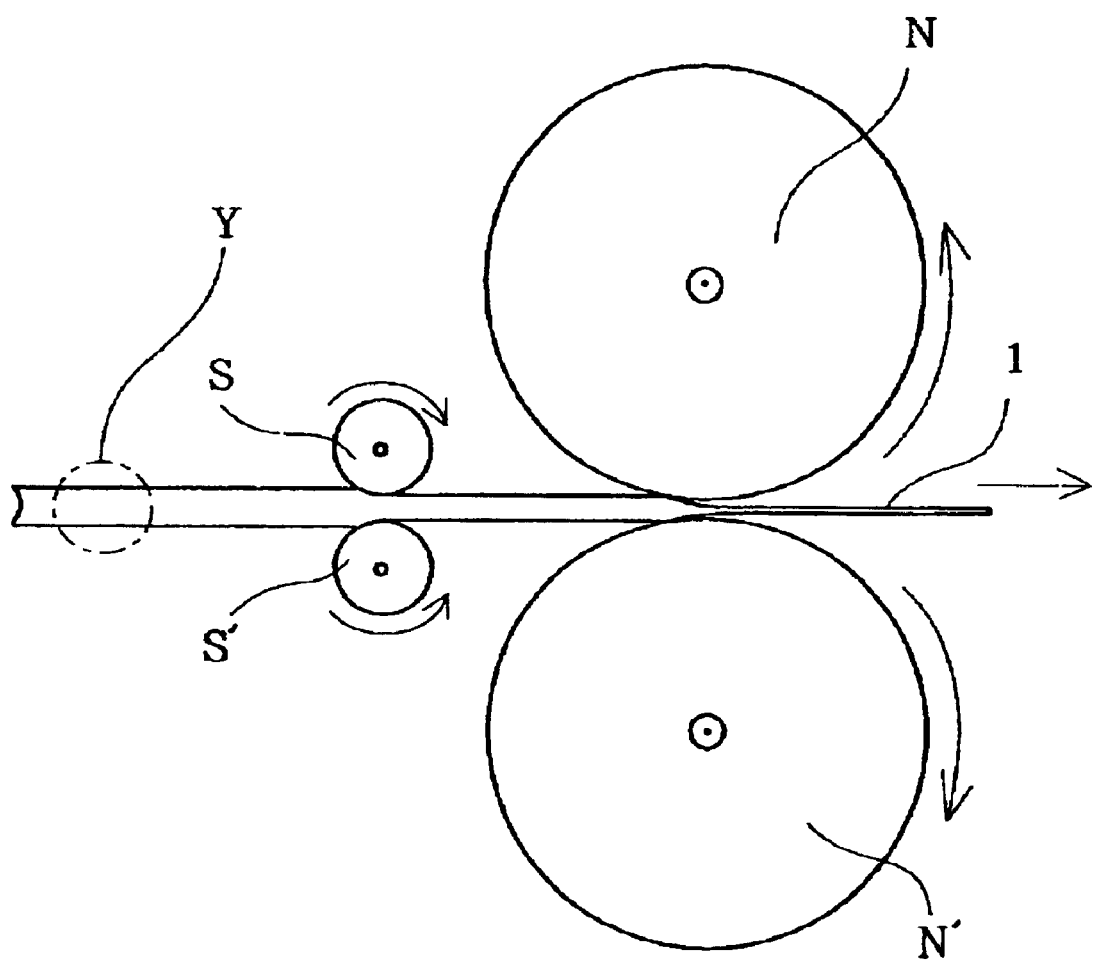
FIG. 6 shows a pressing process for the nickel positive electrode according to one mode of the present invention.

Next, the nickel electrode substrate obtained by filling in the paste of mixed powder including the active material and then by drying it is passed between a pair of rollers with diameters of approximately 30 mm rotating at a relatively high speed represented by S and S' in FIG. 6 so that the surfaces are rubbed and lightly compressed with the revolution number of 10 rpm/sec. It then is pressed between the rollers with diameters of approximately 450 mm represented by N and N' so as to be strongly pressed into the thickness of 400 $\mu$m. This nickel positive electrode has become an electrode even lighter than the lightest 3DM type electrode according to a prior art since the nickel body only occupies 3 vol. %, which makes the amount of metal approximately half of 6 to 9 vol. % of the conventional 3DM type.

This electrode is cut into a width of 40 mm and a length of 150 mm and, after that, is immerged in a suspension of microscopic powders of fluororesin of a concentration of approximately 3 wt % and, then, is dried to gain a nickel positive electrode. This is combined with a negative electrode of the conventional MmNi$_5$ type hydrogen absorbing alloy wherein the thickness is 220 $\mu$m, the width is 40 mm and the length is 210 mm so as to be inserted into an AA size battery case of, which is obtained as a production example. In addition, by sealing with the lid 6, which also works as a positive terminal and is known in the art, and a gasket 5 as in FIG. 3, a sealed cylindrical Ni/MH battery of AA size is manufactured, of which the theoretical capacity of the positive electrode is 1550 mAh. And, as for the separator an unwoven cloth of sulfonated poly-olefin resin fiber of the thickness of 120 $\mu$m is adopted while a KOH solution of approximately 30 wt. % is used for the electrolyte.

Here, for the purpose of evaluating the characteristics of the nickel positive electrode in particular, that is to say, in order to avoid the effect of the characteristics of the negative electrode on the cell performances as much as possible, the standard battery is made to have a theoretic capacity of the negative electrode as much as 1.8 times as large as that of the positive electrode by adjusting the normally designed capacity balance of the positive and negative electrodes. For reference, commercially used batteries have the negative electrodes which are 1.3 to 1.6 times as large.

Figure 8:
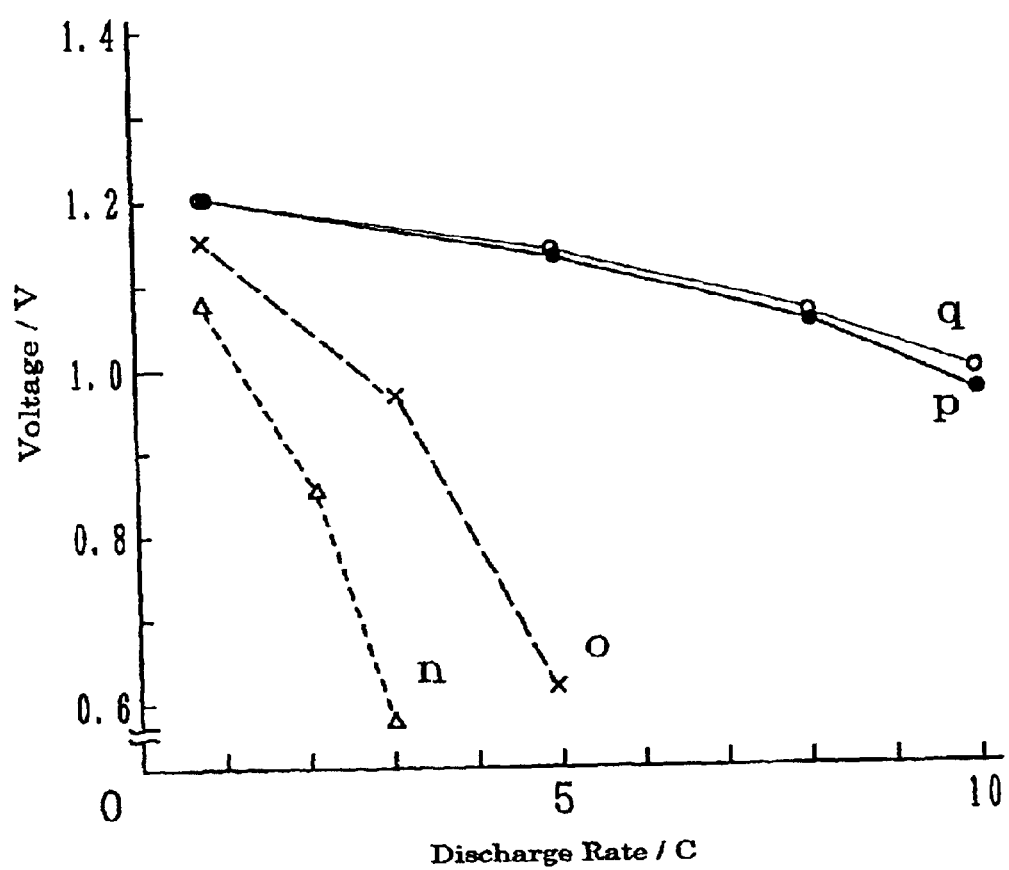
FIG. 8 shows high-rate discharge characteristics of a sealed cylindrical Ni/MH battery (AA size) using a nickel positive electrode according to one embodiment of the present invention.

FIG. 8 shows a mean value of high-rate discharge characteristics for ten cells of this battery indicated as q. The discharge voltage indicated along the vertical axis shows the voltage at the time of 50% of DOD (Depth of Discharge) of the theoretical capacity.

Comparative Examples 1 to 3

As Comparative Example 1, a battery is manufactured in the same way as in Embodiment 1 except for the usage of the electrode substrate which is pressed between conventional plates, that is to say, the processing is the same except for that no operations for bending the edges of the concave and convex parts in one direction are applied to the conductive electrode substrate and, then, the discharge characteristics are examined, of which the result is indicated as p in FIG. 8.

As Comparative Example 2, a battery is manufactured in the same way as in Embodiment 1 except for the use of 3DM type nickel positive electrode which is an electrode manufactured in the same way as in Embodiment 1 except that a conventional foam nickel porous body (trade name: Cellmet made by Sumitomo Denko) is used for the conductive electrode substrate, and the examination result of this case is indicated as o in FIG. 8.

As Comparative Example 3, a battery is manufactured in the same way as in Embodiment 1 except for the use of a conductive electrode substrate for which the pitch between convex column and next convex column is 400 $\mu$m (approximately twice as in Embodiment 1), and the result of this case is indicated as n in FIG. 8.

Figure 9:
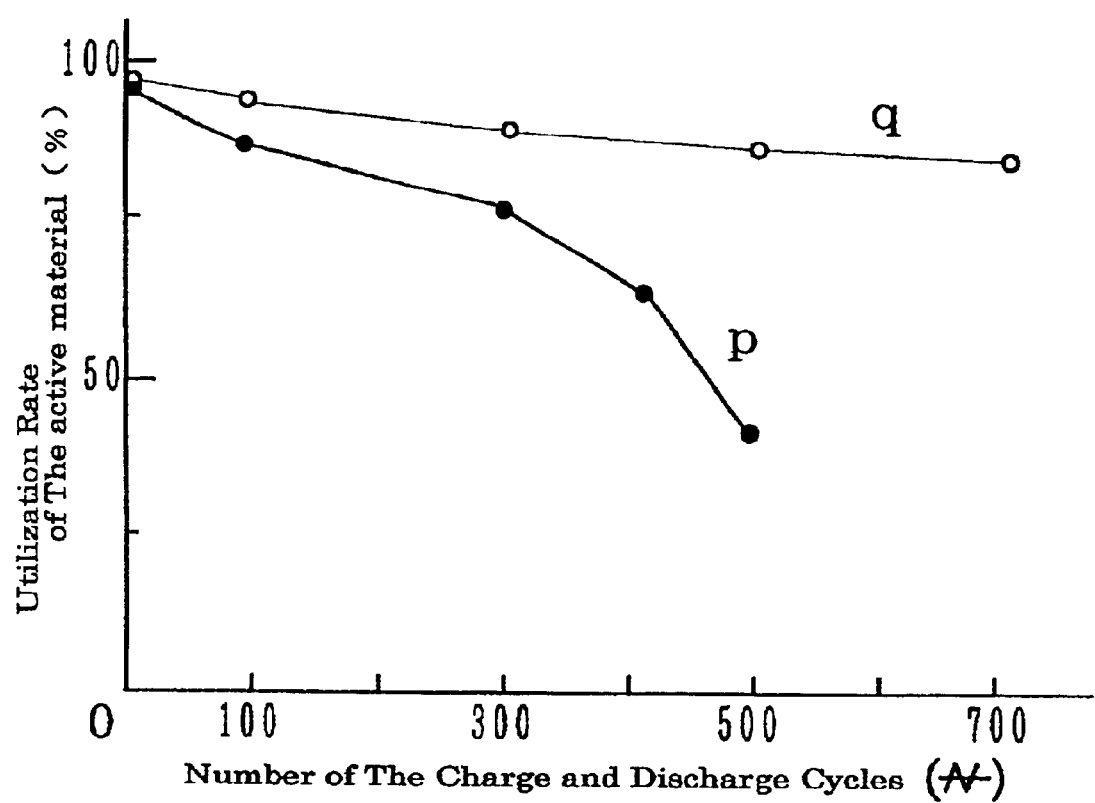
FIG. 9 shows cycle-life characteristics of a sealed cylindrical Ni/MH battery (AA size) using a nickel positive electrode according to one mode of the present invention.

As a result of Embodiment 1 and Comparative Examples 1 to 3, the case of the present embodiment exhibits the most excellent characteristics and has a voltage close to 1V even at the time of 10C-rate discharge. Particularly, the effects obtained by making the distance between the convex parts column and the neighboring convex parts column to be 200 $\mu$m are large. That is to say, in this case, the distance to the farthest distant active material powders represented by M' in FIG. 1 is in the range of 70 to 100 $\mu$m. Though the battery of p indicated an excellent high drain characteristic, it exhibits a large capacity deterioration after the completion of 500 cycles as opposed to a battery according to the present invention, which exhibits little decay in capacity even after the completion of 700 cycles in a cycle-life test which repeats 1C-rate discharging and 1C-rate charging (110% charge of the discharge capacity) at a temperature of 20° C. as shown in FIG. 9. In this case both batteries in Embodiment 1 and Comparative Example 1 are tested for ten cells, however, in FIG. 9 two cells each which exhibit the upper and the lower characteristics among them are eliminated so as to use a mean value of six cells which exhibit the remaining intermediate characteristics. Here, as for a battery in p, two cells out of the ten cause a short circuit before and after the one hundredth cycle. The effect due to the contour of the concave and convex edges is extremely large with respect to causing a short circuit.

That is to say, in the case that a structure of the conductive electrode substrate according to the present invention is adopted, excellent in high-rate discharge characteristics are obtained, and the wrapping of the powders containing the active material is improved so as to gain a battery whose cycle life is excellent and wherein a microscopic short circuit rarely occurs (the reliability is high).

The substrate of the alloy negative electrode according to the present embodiment is improved slightly in the characteristics of q in FIGS. 8 and 9 when the nickel electrode substrate according to the present invention is adopted. That is to say, it is understood that a similar effect is obtained in a thin alloy negative electrode. In addition, a similar effect can be expected for a Li secondary battery, which requires a high-rate discharge, maintainability of excellent active material powders, and excellent cycle life because of a similar principle.

Embodiment 2

A sealed cylindrical Ni/MH battery is manufactured in the same way as in Embodiment 1 except for the use of the conductive electrode substrate to which the pattern of the partially enlarged FIG. 5(b) is applied as a pattern for unevenness in the processing of the nickel foil. High-rate discharge characteristics and cycle life were also examined with this battery as well. In this case also, the pitch between the adjacent convex and convex parts across the concave parts or between the adjacent concave and concave parts across the convex parts is 200 μm. The angle m' made between columns of the convex parts or columns of the concave parts and the direction of the length of the electrode is 30 degrees.

In the case of the present embodiment also, the same characteristics as in Embodiment 1 are obtained, showing excellent high-rate discharging and cycle-life characteristics.

Here, in a nickel electrode using the substrate obtained by corrugated form processing a nickel foil in the longitudinal direction of the electrode substrate or in the perpendicular direction to that longitudinal direction (in such cases the angle corresponding to m' is 90 degrees or 0 degrees), the active material powder sheds at the time of spirally winding processing and, therefore, utilization of the active material has been significantly lowered from the initial point for most cells.

Judging from the present embodiment, it is considered that the current collection characteristics become excellent in the case that the angle between the columns of the convex parts or the concave parts and the longitudinal direction is in a range of about 30 to 60 degrees, so as to be able to prevent the nickel electrode substrate from being changed partially or completely to a two dimensional form at the time of rolling press work and to retain the nickel substrate deposited on the entire electrode.

Embodiment 3

A sealed cylindrical Ni/MH battery is manufactured in the same way as in Embodiment 1 except for the use, as the conductive electrode substrate, of a conductive electrode substrate obtained by forming a nickel foil with a rolling mill while attaching cobalt foils or cobalt powders on both sides of a nickel plate which is originally thick when nickel is processed. High-rate discharge characteristics and cycle life were examined with this battery as well. Here, the amount of cobalt is 0.5 wt. % of the nickel. In this case since the cobalt oxide generated on the substrate surface is superior to that of nickel in electronic conductivity, the high-rate discharging characteristics are only slightly improved compared with the case of Embodiment 1.

Embodiments 4 to 9

A sealed cylindrical Ni/MH battery is manufactured in the same way as in Embodiment 3 except that in Embodiment 4 calcium is attached to the surface of the nickel foil instead of cobalt foil attached thereto. In addition, titanium, silver, yttrium, lanthanide, or carbon is used instead of the cobalt foil in Embodiment 3 to obtain Embodiments 5 to 9, respectively. The cycle-life and discharging characteristics of the sealed cylindrical Ni/MH battery in each embodiment are examined and recognized to have a little effect in the improvement of the cycle-life and high-rate discharging characteristics. Here, with a little more boron content on the surface of the substrate, in any cases, some effect was recognized in the improvement of distribution in the cycle-life.

Embodiment 10

A sealed cylindrical Ni/MH battery is manufactured in the same way as in Embodiment 1 except for making the surface of the nickel foil in Embodiment 1 a rough surface having innumerable microscopic concave and convex parts by mechanical forming or fine nickel powder coating. The cycle-life and discharging characteristics of the sealed cylindrical Ni/MH battery according to the present embodiment are examined and recognized to be improved in the cycle-life and high-rate discharging characteristics, approximating Embodiment 3.

Embodiment 11

Nickel foil in a wide belt-like form of the thickness of 30 μm is pressed between a pair of dies (or between rollers) wherein innumerable microscopic cone concavities and convexities are formed on the surface of the both dies so that a three dimensional conductive electrode substrate provided in the pattern of FIG. 5 (a) is manufactured.

The thickness of a three-dimensional conductive electrode substrate due to concavities and convexities was 140 μm, and the pitch between the concavity and the closest convexities was 140 μm both in the longitudinal direction and in the perpendicular direction.

Here, active material powder of spherical particles, whose diameter is approximately 10 μm, formed by approximately 1 wt. % of cobalt and approximately 3 wt. % of zinc dissolved into nickel hydroxide so as to form a solid solution, are employed. The active material powders are kneaded with a solution wherein approximately 1 wt. % carboxymethyl cellulose and approximately 1 wt. % of polyvinyl alcohol are dissolved and, in addition, cobalt oxide (CoO) and zinc oxide (ZnO) are added in a ratio of approximately 3 wt. % and approximately 2 wt. % of nickel hydroxide, respectively, to obtain the paste. This paste is filled into the electrode, thereby obtaining the thin electrode, the final electrode whose thickness is the same as that of the conductive electrode substrate. Here, in this final electrode, the pattern of concavities and convexities was so arranged that the distance from the active material that is farthest from the conductive electrode substrate to the conductive electrode substrate is 100 μm.

Embodiment 12

The final electrode was obtained by the same method as in Embodiment 11 except that the thickness of a three-dimensional conductive electrode substrate due to concavities and convexities was 210 μm, and the pitch between the concavity and the closest convexities was 210 μm both in the longitudinal direction and in the perpendicular direction. Here, in this final electrode, the pattern of concavities and convexities was so arranged that the distance from the active material that is farthest from the conductive electrode substrate to the conductive electrode substrate is 150 μm.

Comparative Example 4

A thin electrode that is the final electrode was obtained by the same method as in Embodiment 11 except that the thickness of a three-dimensional conductive electrode substrate due to concavities and convexities was 280 μm, and the pitch between the concavity and the closest convexities was 280 μm both in the longitudinal direction and in the perpendicular direction. Here, in this final electrode, the pattern of concavities and convexities was so arranged that the distance from the active material that is farthest from the conductive electrode substrate to the conductive electrode substrate is 200 μm.

Comparative Example 5

A thin electrode that is the final electrode was obtained by the same method as in Embodiment 11 except that the thickness of a three-dimensional conductive electrode substrate due to concavities and convexities was 420 μm, and the pitch between the concavity and the closest convexities was 420 μm both in the longitudinal direction and in the perpendicular direction. Here, in this final electrode, the pattern of concavities and convexities was so arranged that the distance from the active material that is farthest from the conductive electrode substrate to the conductive electrode substrate is 300 μm.

Evaluation of Embodiments 11 and 12; and Comparative Examples 4 and 5

Figure 12:
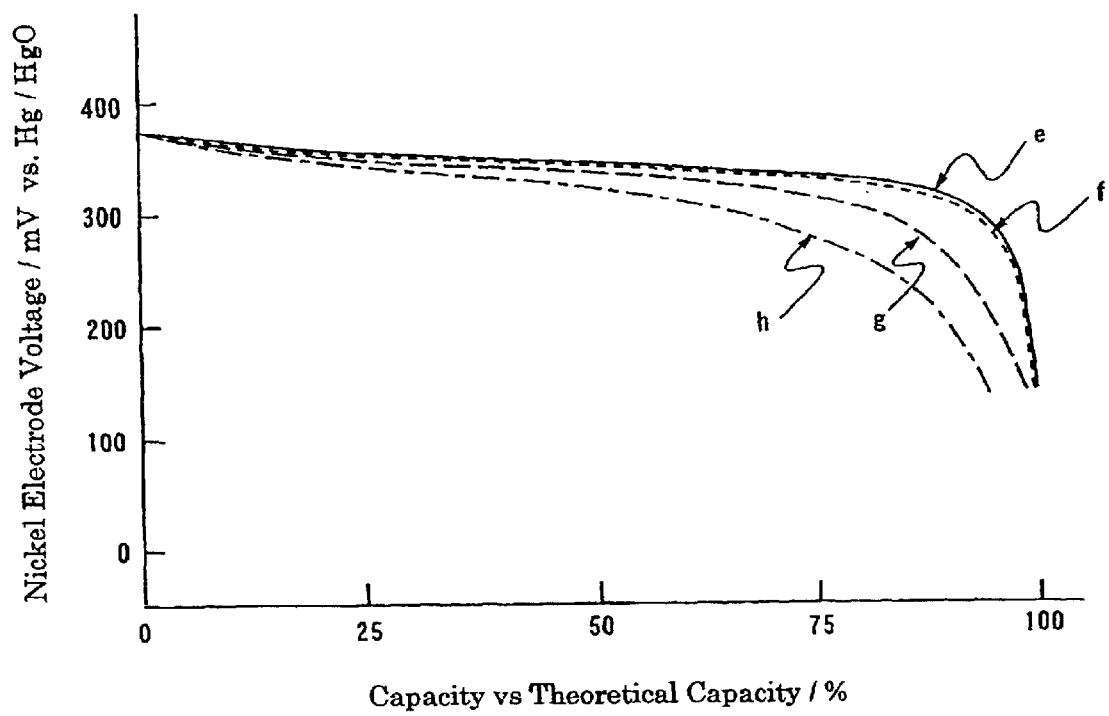
FIG. 12 shows high-rate discharge characteristics of the nickel positive electrode according to one mode of the present invention (half cell)
Figure 13:
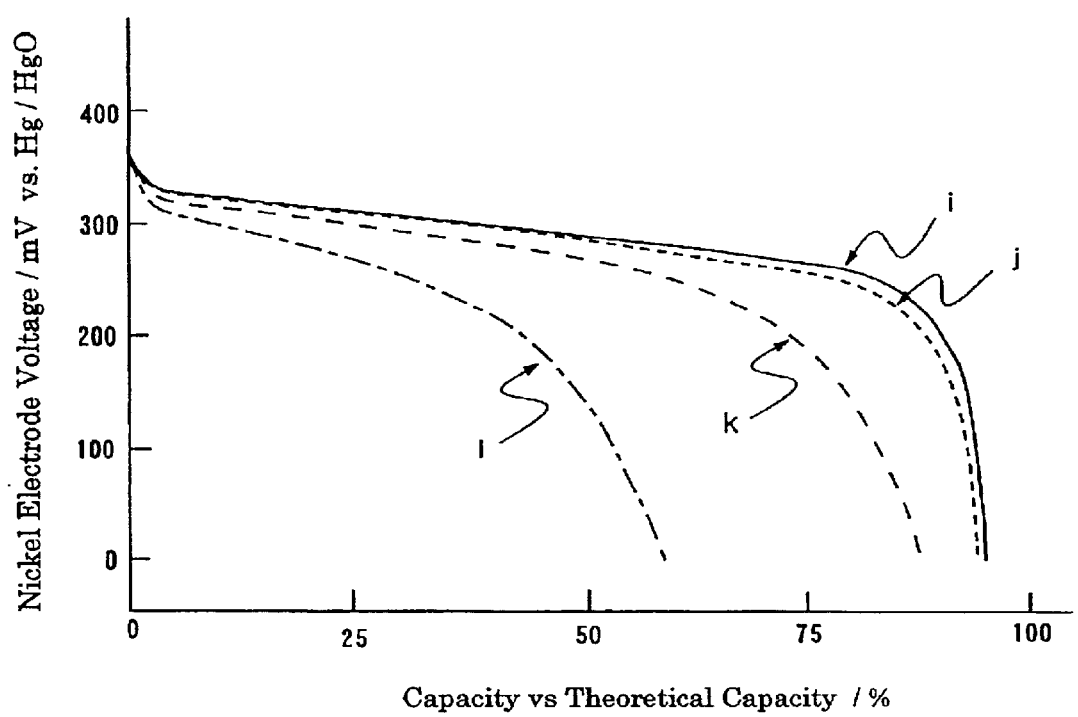
FIG. 13 shows high-rate discharge characteristics of the nickel positive electrode according to one mode of the present invention (half cell).

As for the thin electrode obtained by Embodiments 11 and 12 as well as Comparative Examples 4 and 5, a secondary battery was prepared by the same method as in Embodiment 1 and the high-rate discharge was examined. The results of 0.5C-rate discharging and 5C-rate discharging are shown in FIGS. 12 and 13, respectively. The result of Embodiment 11 is shown as e and i, the result of Embodiment 12 is shown as f and j, the result of Comparative Example 4 is shown as g and k, and the result of is Comparative Example 5 is shown as h and l. The high-rate discharge characteristics of the secondary battery using the thin electrode obtained by Embodiments 11 and 12 were good without any large voltage or capacity deterioration both with 0.5C-rate discharging and 5C-rate discharging. On the other hand, the high-rate characteristics of the secondary battery using the thin electrode obtained by Comparative Examples 4 and 5 was good at 0.5C-rate discharging, showing the large voltage and capacity deterioration, but the high-rate discharge characteristics at 5C-rate discharging was not good. As for Embodiments 11 and 12, by maintaining the distance from the active material that is farthest from the conductive electrode substrate to the conductive electrode substrate within 150 μm, excellency in high-rate discharge characteristics were obtained.

The present application claims priority of Japanese application No.2000-261780 and No.2000-318407, the disclosures of which are incorporated herein by reference. While a detailed description of the invention has been provided above, the present invention is not limited thereto and various modifications will be apparent to those of skill in the art. The invention is defined by the claims that follow.

What is claimed is:

1. A non-sintered thin electrode for batteries comprising powders containing mainly active material powder or pseudo-active material powder filled into or coated on a conductive electrode substrate of a thin electrolyte-proof metal foil having a three dimensional structure, wherein said conductive electrode substrate:

(a) has innumerable hollow concave and convex parts;

(b) is of three dimensional form with said concave and convex parts, whereby said metal foil has a thickness close to that of the electrode;

(c) has the following concave and convex parts thereof
the number of concave parts is not less than half the number of concave and convex parts and each concave part is adjacent to a convex part,
the number of convex parts is not less than half the number of concave and convex parts and each convex part is adjacent to a concave part, wherein
the convex parts and the concave parts include edges, which are regions of the convex parts or concave parts located in close proximity to a surface of the non-sintered thin electrode; and (d) walls of said concave and convex parts are contoured in one direction so as to be more tilted in the same direction at the edges of the concave and convex parts.

2. The non-sintered thin electrode for batteries according to claim 1, wherein a metal is a main component of said conductive electrode substrate of which a major part of the surface is a coarse surface which has innumerable number of microscopic concavities and convexities.

3. The non-sintered thin electrode for batteries according to claim 1, wherein nickel is a main component of said conductive electrode substrate and materials of at least one selected from a group consisting of cobalt, calcium, titanium, silver, yttrium, lanthanide, carbon and oxides of these are arranged on the major part of the surface.

4. The non-sintered thin electrode for batteries according to claim 1, wherein, the edges become thinner at areas closer to the surface of the non-sintered thin electrode.

5. The non-sintered thin electrode for batteries according to claim 1 characterized in that individual concave and convex shapes of said concave and convex parts are a hollow cone, triangular pyramid, quadrangular pyramid, hexagonal pyramid or octagonal pyramid.

6. The non-sintered thin electrode for batteries according to claim 1, wherein the edges of the convex and concave parts tilted in one direction in said conductive electrode substrate are contoured so as to enclose gaps between neighboring convex parts or concave parts, respectively.

7. The non-sintered thin electrode for batteries according to claim 1, wherein the surfaces of the electrode are covered with an electrolyte-proof fine powder of synthetic resin.

8. The non-sintered thin electrode for batteries according to claim 1, wherein an inclination in one direction of the concave and convex parts of the conductive electrode body is approximately perpendicular to the direction of a spiral when said electrode is formed in a spiral shape.

9. A non-sintered thin electrode for batteries according to claim 1, wherein a column of concave parts and a column of convex parts are arranged alternately wherein the columns are arranged substantially in parallel and define an angle of about 30 to about 60 degrees with respect to a longitudinal direction of the electrode.

* * * * *